(No Model.)
W. K. FREEMAN.
CONSTANT POTENTIAL ALTERNATING GENERATOR.
No. 555,152. Patented Feb. 25, 1896.
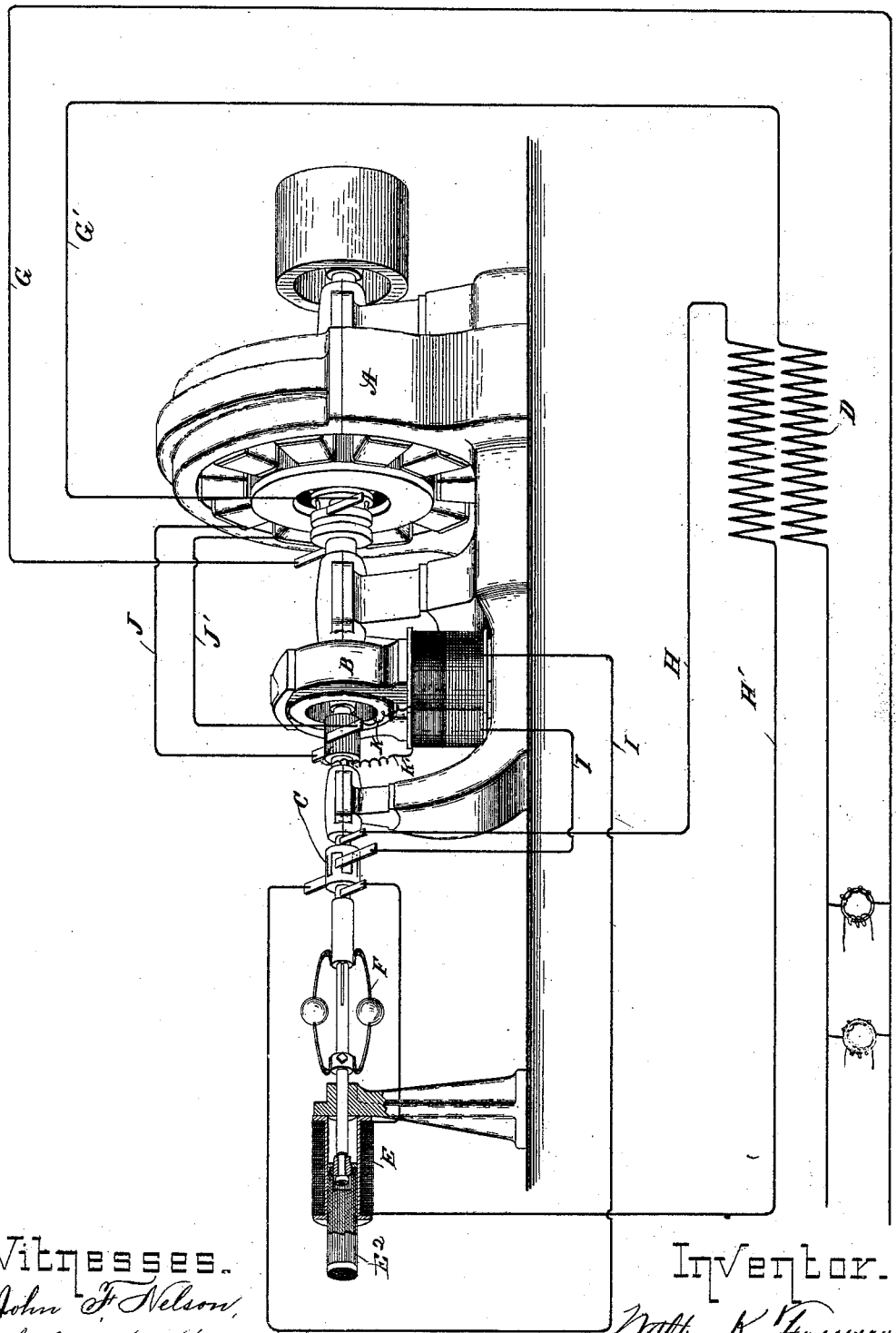
Witnesses.
John F. Nelson,
Nellie A. Morgan.
Inventor.
Walter K. Freeman

UNITED STATES PATENT OFFICE.

WALTER K. FREEMAN, OF FORT WAYNE, INDIANA.

CONSTANT-POTENTIAL ALTERNATING GENERATOR.

SPECIFICATION forming part of Letters Patent No. 555,152, dated February 25, 1896.

Application filed July 5, 1895. Serial No. 555,055. (No model.)

*To all whom it may concern:*

Be it known that I, WALTER K. FREEMAN, of Fort Wayne, in the county of Allen and State of Indiana, have invented certain new and useful Improvements in Systems of Generator Regulation; and I do hereby declare the following to be a full, clear, and exact description of the same, reference being had to the accompanying drawing, forming a part of this specification, and to the letters of reference marked thereon.

This invention relates to improvements in that method of regulation wherein the electromotive force throughout the system is kept approximately constant by increasing or diminishing the strength of the field-of-force magnets of the prime generator, exciter-generator or both, the object of the invention being to provide for a most sensitive regulation of the strength of the field of force by controlling the same, first, by the current flowing in the working circuit, and, secondly, by the variation in the speed of the drive-shaft, the two being combined to mutually operate in varying the current flowing to and consequently the strength of the field-of-force magnets.

In carrying the invention into practice I employ a generator for delivering an alternating or pulsating current having its field-of-force magnets energized by a smaller and preferably direct current-generator. In the main or working circuit of the prime generator I connect a transformer in series with one conductor, which transformer is designed and proportioned to give an induced current in its secondary varying in exact ratio to the variations in the working circuit or in proportion to the variations in the consumption of energy in the working circuit. A commutator is arranged in the secondary of the transformer to correct or cause the current to flow in one direction, and the current so corrected is utilized either directly or through the exciter to energize the field-of-force magnets of the prime generator. In this secondary circuit, however, I interpose a regulator controlled by the speed of rotation of the drive-shaft, usually in the form of a reactive coil having a core positioned by means of an ordinary centrifugal mechanism rotated by the drive-shaft—that is to say, said core will be moved in or out according to the speed of rotation of the drive-shaft, and the coil acts as a controller for the energizing-current. Hence the strength of the latter is dependent upon both the resistance in the working circuit and the speed of rotation of the drive-shaft of the prime generator.

By reference to the accompanying drawing, which represents a sectional perspective view of the apparatus employed and a diagrammatic representation of the circuits, it will be seen that I have shown the prime generator A, the exciter B, correcting-commutator C and centrifugal governor F all on a single shaft, which arrangement is optional and is shown as a matter of convenience only.

Current generated by the prime generator A flows out over the mains G G', in one of which the converter or inductorium D is connected in series, the other or working converters or inductoriums being connected in multiple, as usual. The secondary circuit H H' from the converter passes through the reactive coil E, thence to the correcting-commutator C and heavier windings of the exciter B, the letters I I indicating the leads to the exciter from the correcting-commutator.

I have shown the exciter-field adapted to be energized to a slight extent by a winding connected by wires K K' in shunt with the field of the prime generator, the connection between the latter and exciter being made through wires J J' in the ordinary manner.

The centrifugal governor F rotates in unison with the main drive-shaft and operates to move the core $E^2$ in and out of the reactive coil through any well-known mechanical connections employed for transmitting the motion of such governors.

With the arrangement described it follows now that when the generators are in operation and running at their normal speed the core of the reactive coil will be in an intermediate position ready to be moved in either direction, so by its action to choke off or permit more current to flow. In other words, when the speed of the shaft increases the core is drawn farther in and the current flowing through the coil encounters greater resistance owing to the greater induction, and when the speed decreases the effect is to reduce the resistance and permit more current to flow, thereby increasing the energy of the field and causing the generator to generate more current although the speed of rotation of the armature is reduced. The current flowing or tending to flow through the circuit including the reactive coil and field-coils bears through the action of the transformer a direct relation to or is in direct proportion to the current flowing in the main-line or working circuit. In other words, it is in exact proportion to the energy expended in the working circuit, from which it follows that as current is absorbed in the working circuit a current proportional to the loss is set up in the secondary windings of the transformer, and this in turn energizes the field-of-force magnets to a proportional degree and raises the electromotive force of the main circuit proportionately. It is obvious now that as the transformer compensates for the fluctuations in the working circuit without regard to the speed and as the reactive coil compensates for fluctuations in speed without regard to the fluctuations in the working circuit when acting together they effect a most perfect regulation.

Obviously the exciter may be dispensed with and the field of the prime generator energized by the current induced in the transformer; but for obvious reasons the arrangement shown is preferred.

Having thus described my invention, what I claim as new is—

1. The combination with a system of generator regulation embodying a pulsating-current generator, a transformer having its primary in series with the working circuit of the generator, and its secondary controlling the energizing of the field of force, of a current-regulator controlled by the speed of rotation of the main drive-shaft interposed in said secondary circuit of the transformer, whereby the energy of the field of force is governed in accordance with both the rate of rotation of the drive-shaft and the consumption of energy in the working circuit; substantially as described.

2. The combination with a system of generator regulation embodying a pulsating-current generator and a transformer having its primary in series with the working circuit, and its secondary controlling the energizing of the field of force of the generator, of a reactive coil included in said secondary of the transformer, with means for varying the induction in said reactive coil controlled by the speed of the main drive-shaft of the generator; substantially as described.

3. The combination with a system of generator regulation embodying a pulsating-current generator and a transformer connected in series with the working circuit, with its secondary controlling the energizing of the field of force of the generator, of a reactive coil included in said secondary of the converter, a movable core for said coil and a centrifugal governor rotating in unison with the main drive-shaft for controlling the position of said core with relation to the coil; substantially as described.

4. The combination with a system of generator regulation embodying a pulsating-current generator, a transformer having its primary connected in series with the working circuit and its secondary controlling the energizing of the field of force, of a correcting-commutator located in said secondary, a reactive coil also located in said secondary between the commutator and converter and an induction-varying device controlled by the speed of the main drive-shaft for varying the resistance of the reactive coils; substantially as described.

5. The combination with a system of generator regulation embodying a pulsating-current generator and a transformer having its primary connected in series with a working circuit, of an exciter for the field of force of the prime generator having its field of force energized by the secondary from said converter, a reactive coil and a correcting-commutator in said secondary of the converter, a core for the reactive coil and a centrifugal governor rotated in unison with the main drive-shaft for positioning said core with relation to the coil; substantially as described.

WALTER K. FREEMAN.

Witnesses:
ALEX. S. STEUART,
A. M. KELLY.